United States Patent
Chae et al.

(10) Patent No.: US 8,542,624 B2
(45) Date of Patent: Sep. 24, 2013

(54) METHOD OF TRANSMITTING SIGNAL

(75) Inventors: Su Chang Chae, Daejeon (KR); Seung Kwon Cho, Guri-si (KR); Young-Il Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 414 days.

(21) Appl. No.: 12/808,824

(22) PCT Filed: Sep. 16, 2008

(86) PCT No.: PCT/KR2008/005454
§ 371 (c)(1),
(2), (4) Date: Jun. 17, 2010

(87) PCT Pub. No.: WO2009/078555
PCT Pub. Date: Jun. 25, 2009

(65) Prior Publication Data
US 2010/0290401 A1 Nov. 18, 2010

(30) Foreign Application Priority Data
Dec. 17, 2007 (KR) .................. 10-2007-0132620

(51) Int. Cl.
*H04B 7/14* (2006.01)
(52) U.S. Cl.
USPC ............ 370/315; 370/345; 370/465
(58) Field of Classification Search
None
See application file for complete search history.

(56) References Cited

U.S. PATENT DOCUMENTS

| | | | |
|---|---|---|---|
| 6,118,825 A | 9/2000 | Ikeda et al. | |
| 6,385,254 B1 | 5/2002 | Piirainen et al. | |
| 6,961,367 B2 | 11/2005 | Simic et al. | |

FOREIGN PATENT DOCUMENTS

| | | |
|---|---|---|
| CN | 1778055 | 5/2006 |
| CN | 101098163 A | 1/2008 |
| EP | 1852986 | 11/2007 |
| RU | 2142199 | 11/1999 |
| RU | 2153227 | 7/2000 |
| WO | 2007/051159 | 5/2007 |

OTHER PUBLICATIONS

International Search Report and Written Opinion mailed Apr. 6, 2009 in corresponding International Application No. PCT/KR2008/005454.

*Primary Examiner* — Kevin C Harper
(74) *Attorney, Agent, or Firm* — Staas & Halsey LLP

(57) ABSTRACT

A method of transmitting a signal according to the present invention includes: receiving a signal that is encoded with a predetermined code rate and that is modulated by a first modulation method from a base station; creating a signal that is obtained by demodulating the signal that is modulated by the first modulation method using a method corresponding to the first modulation method; creating a signal that is obtained by modulating the demodulated signal using a second modulation method while maintaining the predetermined code rate; and transmitting the signal that is modulated by the second modulation to a mobile station.

Therefore, it is possible to reduce the cost of the relay station and simplify the system of the relay station. Further, during the modulation and demodulation, the symbol offset is changed to create various modulated and demodulated signals.

12 Claims, 5 Drawing Sheets

| Modulation and rate | j | $j_{M\&F}=6 \cdot j$ |
|---|---|---|
| QPSK 1/2 | 109 | 54 |
| QPSK 2/3 | 6 | 36 |
| QPSK 3/4 | 6 | 36 |
| QPSK 5/6 | 6 | 36 |
| 16QAM 1/2 | 54.5 | 27 |
| 16QAM 2/3 | 3 | 18 |
| 16QAM 3/4 | 3 | 18 |
| 16QAM 5/6 | 3 | 18 |
| 64QAM 1/2 | 33.3 | 20 |
| 64QAM 2/3 | 2 | 12 |
| 64QAM 3/4 | 2 | 12 |
| 64QAM 5/6 | 2 | 12 |

| Modulation and rate | j |
|---|---|
| QPSK 1/2 | 10 |
| QPSK 3/4 | 6 |
| 16QAM 1/2 | 5 |
| 16QAM 3/4 | 3 |
| 64QAM 1/2 | 3 |
| 64QAM 2/3 | 2 |
| 64QAM 3/4 | 2 |
| 64QAM 5/6 | 2 |

FIG. 4

| Number of slots | Slots concatenated |
|---|---|
| $n \leq j$ $n \neq 7$ | 1 block of $n$ slots |
| $n \leq j$ & $n=7$ | 1 block of 4 slots<br>1 block of 3 slots |
| $n > j$ | If ($n \mod j = 0$)<br>$k$ blocks of $j$ slots<br><br>else<br>($k-1$) blocks of $j$ slots<br>1 block of $L_{b1}$ slots<br>1 block of $L_{b2}$ slots<br><br>Where<br>$L_{b1} = \text{ceil}((m+j)/2)$<br>$L_{b2} = \text{floor}((m+j)/2)$<br><br>If ($L_{b1} = 7$) of ($L_{b2} = 7$)<br>$L_{b1} = L_{b1} + 1; L_{b2} = L_{b2} - 1;$ |

FIG. 5

| Modulation and rate | j | $j_{M\&F}=6 \cdot j$ |
|---|---|---|
| QPSK 1/2 | ~~109~~ | 54 |
| QPSK 2/3 | 6 | 36 |
| QPSK 3/4 | 6 | 36 |
| QPSK 5/6 | 6 | 36 |
| 16QAM 1/2 | ~~54.5~~ | 27 |
| 16QAM 2/3 | 3 | 18 |
| 16QAM 3/4 | 3 | 18 |
| 16QAM 5/6 | 3 | 18 |
| 64QAM 1/2 | ~~33.3~~ | 20 |
| 64QAM 2/3 | 2 | 12 |
| 64QAM 3/4 | 2 | 12 |
| 64QAM 5/6 | 2 | 12 |

FIG. 6

| Number of slots | Slots concatenated |
|---|---|
| $n_{M\&F} \leq j_{M\&F}$<br>$n \neq 7$ | 1 block of $n$ slots |
| $n_{M\&F} \leq j_{M\&F}$ & $n=7$ | 1 block of 4 slots<br>1 block of 3 slots |
| $n_{M\&F} > j_{M\&F}$ | If ($n_{M\&F}$ mod $j_{M\&F}$ =0)<br>$k$ blocks of $j_{M\&F}$ slots<br><br>else<br>($k$-1) blocks of $j_{M\&F}$ slots<br>1 block of $L_{b1}$ slots<br>1 block of $L_{b2}$ slots<br><br>Where<br>$L_{b1} = \text{ceil}((m_{M\&F} + j_{M\&F})/2)$<br>$L_{b2} = \text{floor}((m_{M\&F} + j_{M\&F})/2)$<br><br>If ($L_{b1}$ =7) of ($L_{b2}$ =7)<br>$L_{b1} = L_{b1} + 1; L_{b2} = L_{b2} - 1;$ |

METHOD OF TRANSMITTING SIGNAL

CROSS REFERENCE TO RELATED APPLICATIONS

This application claims the benefit of International Application No. PCT/KR2008/005454, filed Sep. 16, 2008, and claims the benefit of Korean Application No. 10-2007-0132620, filed Dec. 17, 2007, the disclosures of all of which are incorporated herein by reference.

TECHNICAL FIELD

The present invention relates to a method of transmitting a signal. Particularly, the present invention relates to a method of transmitting a signal through a relay station.

The present invention was supported by the IT R&D program of MIC/IITA [2006-S-011-02, Development of Relay/Mesh Communication System for Multi-hop WiBro].

BACKGROUND ART

A broadband wireless Internet system can provide a wireless Internet system while a mobile station moves at a speed of 60 Km/h.

The demand for wireless Internet is rapidly increasing as a substitute for the wired Internet, and the wired Internet is being replaced by the wireless Internet, which is less expensive. However, as the wireless Internet service widely spreads, an increased number of base stations are required.

In order to reduce a cost for installation of base stations, an inexpensive relay station is provided between a base station and a mobile station. The relay station uses an existing base station to increase the entire transmission rate with a high transmission speed and improved channel environment.

Currently, the Institute of Electrical and Electronics Engineers 802.16 Working Group (IEEE 802.16 WG) is organizing a relay task group (relay TG) to proceed with standardization as of the beginning of 2006.

The relay TG has to secure compatibility without changing the system of the existing base stations, improve the entire throughput by improving the channel environment outside the base stations through the relay station system, and must allow installation at a lower cost than the base stations.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method of transmitting a signal having advantages of reducing the cost at a relay station.

Technical Solution

A method of transmitting a signal according to an exemplary embodiment of the present invention includes: receiving a signal that is encoded with a predetermined code rate and modulated by a first modulation method from a base station; creating a signal obtained by demodulating the signal modulated by the first modulation method using a method corresponding to the first modulation method; creating a signal obtained by modulating the demodulated signal using a second modulation method while maintaining the predetermined code rate; and transmitting the signal modulated by the second modulation method to a mobile station.

The second modulation method may be different from the first modulation method.

The second modulation method may be the same as the first modulation method.

The received signal may be encoded by a forward error correction encoding method.

The forward error correction encoding method may be performed in the unit of a data block, and the number of slots of the data block may be determined depending on the code rate and the first modulation method.

A method of transmitting a signal according to another exemplary embodiment of the present invention includes: defining data to be transmitted to a mobile station through a relay station; creating a data block having an integrated slot by making the number of slots of the data block for forward error correction encoding an integer; creating an encoded signal by encoding a plurality of data blocks with a predetermined code rate; creating a first modulated signal by modulating the encoded signal; and transmitting the first modulated signal to the mobile station through the relay station.

The creating of a data block may include: selecting a code rate and modulation method for the data to be transmitted to the relay station; calculating the number of slots of the data block according to the selected code rate and the modulation method; and making the number of slots an integer by multiplying the least common multiple of denominators of the number of slots according to the code rate and the modulation method by the number of slots.

The defining of data to be transmitted through the relay station may define data that is directly transmitted to the mobile station and data that is transmitted to the mobile station through the relay station.

The number of slots of the data block may be determined according to a standard that defines the number of slots according to the code rate and the modulation method.

The data that is directly transmitted to the mobile station may determine the number of slots of the data block according to a standard that is different from that of data transmitted through the relay station.

When the number of allocated slots is smaller than the number of slots determined by the standard, the data block may have the same number of slots as that of the allocated slots.

When the number of allocated slots is larger than that of slots determined by the standard, the number of data blocks may be determined by dividing the number of allocated slots by the number of slots determined by the standard.

When the number of allocated slots is exactly divided into the number of standard without a remainder, the number of created data blocks may be equal to the quotient, and each data block may include the number of slots determined by the standard.

When the number of allocated slots is not exactly divided into the number of standards without remainder, the number of created data blocks may be 1 larger than the quotient.

When the number of data blocks is 1 smaller than the quotient, the data blocks may have a number of slots determined by the standard, and one data block may have a value that is rounded up from a value obtained by dividing the sum of the remaining values and the number determined by the standard by 2 and another data block may have a value that is that rounded down from a value obtained by dividing the sum of the remaining values and the number determined by the standard by 2.

When the rounded up value and the rounded down value are equal to a predetermined value, 1 is added to the rounded up value and 1 is subtracted from the rounded down value.

The transmitting of a signal to the mobile station through the relay station may include: creating a demodulated signal by demodulating the first modulated signal; creating a second modulated signal by modulating the demodulated signal while maintaining a predetermined code rate; and transmitting the second modulated signal to the mobile station.

The second modulated signal may be modulated by a different modulation method from that of the first modulated signal.

Advantageous Effects

Therefore, according to the exemplary embodiments of the present invention, it is possible to reduce the cost for installation of a relay station and simplify the system of the relay station. Further, during the modulation and demodulation, the symbol offset is changed to create various modulated and demodulated signals.

DESCRIPTION OF DRAWINGS

FIG. 4 shows a concatenation method on the basis of the concatenated length of FIG. 3.

FIG. 5 shows a concatenated length with respect to modulation and code rate according to another exemplary embodiment of the present invention.

FIG. 6 shows a concatenation method on the basis of the concatenated length of FIG. 5.

MODE FOR INVENTION

Figure 1:
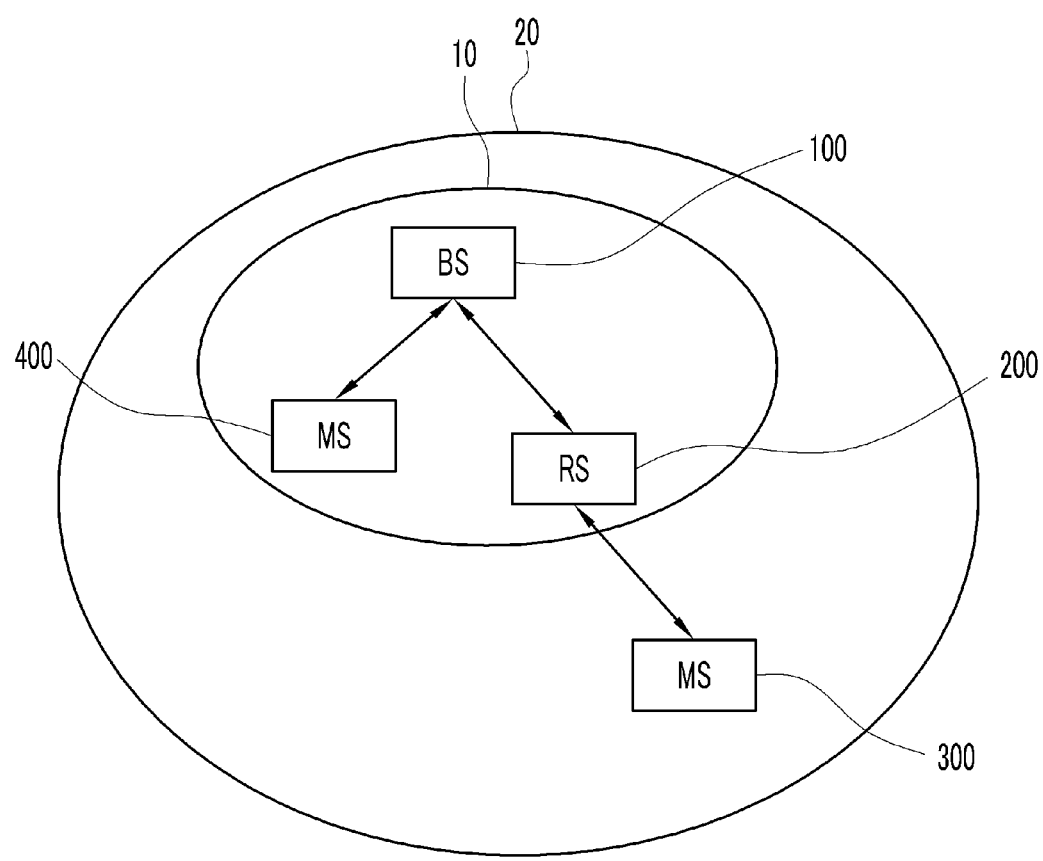
FIG. 1 is a conceptual diagram showing a wireless communication system including a relay station.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation and can be implemented by hardware components or software components and combinations thereof.

In this specification, a mobile station (MS) may refer to a terminal, a mobile terminal (MT), a subscriber station (SS), a portable subscriber station (PSS), user equipment (UE), and an access terminal (AT), and may include some or all functions of a terminal, a mobile terminal, a subscriber station, a portable subscriber station, user equipment, and an access terminal.

Further, in the specification, a base station (BS) may refer to an access point (AP), a radio access station (RAS), a node B, and an evolved node B (eNB) transmitting/receiving base station (BTS), and may include some or all functions of an access point (AP), a radio access station (RAS), a node B, and an evolved node B (eNB) transmitting/receiving base station.

Hereinafter, a wireless communication system that includes a relay station between a base station and a mobile station will be described.

Figures 2, 3:
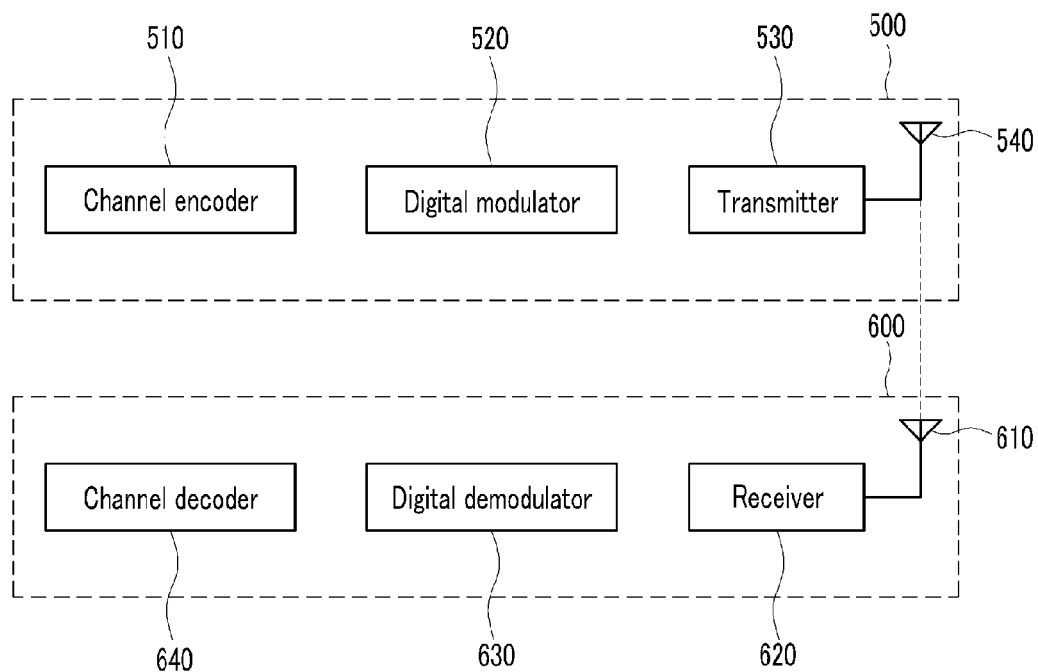
FIG. 2 is a schematic diagram showing a signal transmitter and a signal receiver.
FIG. 3 shows a concatenated length with respect to modulation and code rate according to an exemplary embodiment of the present invention.

FIG. 1 is a conceptual diagram showing a wireless communication system including a relay station, and FIG. 2 is a schematic diagram showing a signal transmitter and a signal receiver.

Referring to FIG. 1, the wireless communication system includes a base station 100, mobile stations 300 and 400, and a relay station 200. The base station 100 controls a predetermined communication range 10, and communicates with the mobile station 400 and the relay station 200 within the controlled range 10.

The relay station 200 is located between the base station 100 and the mobile station 300, receives signals from the base station 100 and the mobile station 300, and modulates and demodulates the signals to transmit the signals to the mobile station 300 and the base station 100.

That is, the transmission/reception between the base station 100 and the mobile station 300 performed by the relay station 200 is divided into two types of connections, that is, between the base station 100 and the relay station 200 and between the relay station 200 and the mobile station 300

The relay station 200 transmits a signal to the mobile station 300 located outside the communication range 10 of the base station 100 through modulation/demodulation to extend the communication range 20 and enhance the transmission rate.

In this case, the base station 100 directly transmits/receives signals to/from the mobile station 400.

Each of the base station 100, the relay station 200, and the mobile station 300 includes a signal transmitter 500 and a signal receiver 600 as shown in FIG. 2.

The signal transmitter 500 includes a channel encoder 510, a digital modulator 520, a transmitter 530, and an antenna 540.

The channel encoder 510 performs channel coding such as turbo coding, convolutional coding, or convolutional turbo coding (CTC) on data to create and output channel coded data.

The digital modulator 520 performs digital modulation such as binary phase shift key (BPSK) modulation or quadrature amplitude modulation (QAM) on the channel coded data to create and output a plurality of symbols.

The transmitter 530 performs symbol mapping on the plurality of symbols output from the digital modulator 520 and transmits them through the antenna 540.

Specifically, the transmitter 530 maps the plurality of symbols in a time or frequency domain to creates mapped symbols and applies other codes to obtain diversity, and then performs Fourier inverse transformation.

Then, the symbol that is converted into a time domain signal is converted into a radio frequency to be transmitted through the antenna 540.

The signal receiver 600 includes an antenna 610, a receiver 620, a digital demodulator 630, and a channel decoder 640.

The receiver 620 converts the signal received through the antenna 610 into a base band signal and then performs a fast Fourier transformation (FFT) to create a received symbol.

The digital demodulator 630 estimates a symbol on the basis of a received symbol of a subcarrier using a channel status and a code value.

The channel decoder 640 performs demodulation such as Viterbi demodulation on a plurality of symbols of the digital demodulator 630 to create data information.

Hereinafter, a method of transmitting a signal with a relay station located between a base station and a mobile station will be described.

FIG. 3 shows a concatenated length with respect to modulation and code rate according to an exemplary embodiment of the present invention, and FIG. 4 shows a method of creating an FEC block, that is, a concatenation method on the basis of the concatenated length of FIG. 3.

When a CTC method that is one of forward error correction methods (hereinafter simply referred to as FEC) is used as a channel coding method, a j parameter determines the length of an FEC block.

As shown in FIG. 3, the j parameter is determined on the basis of the modulation method and a code rate, and has a value defined on the basis of the international standard established by IEEE 802.16.

In this case, the j parameter determines the length of the FEC block.

According to the method of creating an FEC block shown in FIG. 4, the number of FEC blocks and the number of slots per block are determined depending on the number of total slots.

The number of total slots, n, has a value that is found by dividing the allocated slot by the repetition number, and the repetition number is 1, 2, 4, or 6. Further, the repetition is performed for every slot or every FEC block.

In this case, when the signal transmitter performs space time coding (STC) with a plurality of antennas, the number of total slots, n, is a value that is found by dividing the value obtained by multiplying the allocated slot and the STC rate by the value obtained by multiplying the repetition number and the number of antennas.

If the number of total slots, n, is smaller than j, the number of created FEC blocks is one, and the number of slots in the block is n.

If the number of total slots, n, is larger than j, the operation is performed by a module.

In this case, the value of n mod j is 0, and k FEC blocks in which j slots are included are created.

k is defined by a quotient of n divided by j.

In the meantime, if the value of n mod j is m (but is not 0), k−1 FEC blocks are created and two additional blocks that have slots Lb1 and Lb2 are created.

In this case, Lb1 has a value obtained by rounding up (m+j)/2, and Lb2 has a value obtained by rounding down (m+j)/2.

If both the Lb1 and Lb2 have the same value, 7, the value of Lb1 is 7+1 and the value of Lb2 is 7−1.

In the meantime, if n is 7, two FEC blocks that have four slots and three slots, respectively, are created.

When the standards of IEEE 802.16 are defined, in consideration of the efficiency of other functions on the level of the entire system, the FEC blocks are created so as not to have seven slots.

The channel encoder 510 performs CTC on a plurality of FEC blocks created by the concatenation method shown in FIG. 4.

The digital modulator 520 performs a predetermined modulation method on a coded slot to create a plurality of symbols.

For example, when the number of total slots, n, is 50, quadrature phase shift keying (QPSK) modulation is performed, and the CTC is performed with 1/2 of code rate, j=10, in FIG. 3. Therefore, 5 FEC blocks in which 10 slots are included are created.

In this case, if one slot has 48 symbols, 5 FEC processes are performed for every 480 symbols.

The base station 100, the relay station 200, and the mobile station 300 include standards shown in FIG. 3 and FIG. 4, and perform coding/decoding and modulation/demodulation according to the standards to transmit/receive signals.

Meanwhile, the relay station 200 according to the embodiment of the present invention may not include the channel encoder 510 and the channel decoder 640 shown in FIG. 2 for simplification of the apparatus.

Hereinafter, with reference to FIG. 5 and FIG. 6, the signal transmission by the relay station 200 when the relay station 200 does not include the channel encoder 510 and the channel decoder 640 will be described.

The relay station 200 according to another exemplary embodiment of the present invention transmits signals to the mobile station 300 depending on the signal transmission between the relay station 200 and the base station 100.

FIG. 5 shows a concatenated length with respect to modulation and code rate according to an exemplary embodiment of the present invention, and FIG. 6 shows a method of creating an FEC block on the basis of the concatenated length of FIG. 5.

The relay station 200 transmits signals to the mobile station 300 with the same code rate as the code rate determined by the transmission in the base station 100, and description of the channel coding/decoding process will be omitted.

In this case, the base station 100 has the standards shown in FIG. 5 and FIG. 6, and performs the channel coding and modulation according to the standards shown in FIG. 5 and FIG. 6 to transmit signals to the relay station 200.

The modulation and code rate shown in FIG. 5 are the same as those of FIG. 3, and the j parameter is to the same as or different from that of FIG. 3.

As shown in FIG. 5, the j parameter might not be an integer.

Accordingly, in order to make the length of each FEC block an integer, the standard shown in FIG. 5 includes extended j parameters that are products of the least common multiple of denominators of a plurality of j parameters with the j parameters.

For example, as shown in FIG. 5, when the j parameters are 4.5 and 3.3, extended j parameters for the corresponding modulation and code rates are calculated by multiplying the least common multiple of denominators, 6, for making them integers with j.

Further, as shown in FIG. 6, for n and m, the multiplication is performed on the same least common multiple to obtain extended values of n and m. Furthermore, the operation shown in FIG. 4 is performed with the extended j, n, and m to determine the number of slots of each FEC block and the number of FEC blocks.

The relay station 200 receives a channel coded and modulated signal from the base station 100 according to the standards shown in FIG. 5 and FIG. 6, and demodulates the signal according to the standards shown in FIG. 3 and FIG. 4.

The relay station 200 selects a modulation method that has the same code rate as that of the signal received from the base station 100 among modulation methods shown in FIG. 3 to perform modulation.

For example, when a QPSK modulated signal having a 1/2 code rate is received from the base station 100, the relay station 200 changes the symbol offset to perform QPSK, 16-QAM, or 64-QAM that have the same code rate, 1/2, and creates symbols. Then, the relay station 200 transmits the symbols to the mobile station 100.

The mobile station 100 receives the signals from the relay station 200, and performs the demodulation and the channel decoding according to the standards shown in FIG. 3 and FIG. 4 to extract data information.

As described above, the base station 100 selectively operates according to the standards shown in FIG. 3 and FIG. 4 for direct transmission/reception between the base station 100 and the mobile station 300, and the base station 100 and the relay station 200, including channel coding/decoding, and operates according to the standards shown in FIG. 5 and FIG. 6 for transmission/reception between the base station 100 and the relay station 200 not including channel coding/decoding, according to the schedule.

Therefore, when a code rate is fixed at the signal transmission between the base station 100 and the relay station 200 and the signal transmission between the relay station 200 and the mobile station 300, the channel coding and decoding process at the relay station 200 will be omitted, which reduces the cost and increases the processing speed.

The exemplary embodiment of the present invention that has been described above may be implemented by not only an apparatus and a method but also by a program that is capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a signal, comprising:
defining data to be transmitted to a mobile station through a relay station;
creating a data block having an integrated slot by making the number of slots of the data block for forward error correction encoding an integer;
creating an encoded signal by encoding a plurality of data blocks with a predetermined code rate;
creating a first modulated signal by modulating the encoded signal; and
transmitting the first modulated signal to the mobile station through the relay station,
wherein the creating of a data block includes:
selecting a code rate and a modulation method for the data to be transmitted to the relay station;
calculating the number of slots of the data block according to the selected code rate and the modulation method; and
making the number of slots the integer by multiplying the least common multiple of denominators of the number of slots according to the code rate and the modulation method by the number of slots.

2. The method of claim 1, wherein the defining of data to be transmitted through the relay station defines data that is directly transmitted to the mobile station, and data that is transmitted to the mobile station through the relay station.

3. The method of claim 2, wherein the number of slots of the data block is determined according to a standard that defines the number of slots according to the code rate and the modulation method.

4. The method of claim 3, wherein the data that is directly transmitted to the mobile station determines the number of slots of the data block according to a standard that is different from that of data transmitted through the relay station.

5. The method of claim 4, wherein when the number of allocated slots is smaller than the number of slots determined by the standard, the data block has the same number of slots as that of the allocated slots.

6. The method of claim 5, wherein when the number of allocated slots is larger than that of slots determined by the standard, the number of data blocks is determined by dividing the number of allocated slots by the number of slots determined by the standard.

7. The method of claim 6, wherein when the number of allocated slots is exactly divided into the number of standard without a remainder, the number of created data blocks is equal to the quotient, and each data block includes the number of slots determined by the standard.

8. The method of claim 7, wherein when the number of allocated slots is not exactly divided into the number of standards without remainder, the number of created data blocks is 1 larger than the quotient.

9. The method of claim 8, wherein when the number of data blocks is 1 smaller than the quotient, the data blocks have a number of slots determined by the standard, and
one data block has a value that is rounded up from a value obtained by dividing the sum of the remaining values and the number determined by the standard by 2 and another data block has a value that is rounded down from a value obtained by dividing the sum of the remaining values and the number determined by the standard by 2.

10. The method of claim 9, wherein when the rounded up value and the rounded down value are equal to a predetermined value, 1 is added to the rounded up value and 1 is subtracted from the rounded down value.

11. The method of claim 10, wherein the transmitting of a signal to the mobile station through the relay station includes:
creating a demodulated signal by demodulating the first modulated signal;
creating a second modulated signal by modulating the demodulated signal while maintaining a predetermined code rate; and
transmitting the second modulated signal to the mobile station.

12. The method of claim 11, wherein the second modulated signal is modulated by a different modulation method from that of the first modulated signal.

* * * * *